US006608405B1

(12) United States Patent
Zakharian

(10) Patent No.: US 6,608,405 B1
(45) Date of Patent: Aug. 19, 2003

(54) METHOD OF OBTAINING THE ADJUSTABLE CAPACITOR

(75) Inventor: Manvel Zakharian, 4655, boul. Samson, Laval, Quebec (CA), H7W 2H0

(73) Assignee: Manvel Zakharian (CA)

( * ) Notice: Subject to any disclaimer, the term of this patent is extended or adjusted under 35 U.S.C. 154(b) by 0 days.

(21) Appl. No.: 08/995,415

(22) Filed: Dec. 19, 1997

(30) Foreign Application Priority Data

Jun. 6, 1997 (CA) .............................. 2206089

(51) Int. Cl.⁷ ................................ H02M 3/06
(52) U.S. Cl. ...................... 307/109; 307/108; 323/352; 361/321.1
(58) Field of Search ................ 307/109, 108; 323/352; 361/321.1

(56) References Cited

U.S. PATENT DOCUMENTS 5,463,285 A  * 10/1995  El-Hamamsy .............. 315/248
5,568,035 A  * 10/1996  Kato et al. ................... 320/1
6,013,958 A  *  1/2000  Aytur ......................... 307/109
6,320,281 B1 * 11/2001  Zakharian ................... 307/109

* cited by examiner

*Primary Examiner*—Brian Sircus
*Assistant Examiner*—Robert L. DeBeradinis

(57) ABSTRACT

The method of obtaining the adjustable capacitor permits transforming all types of capacitors (including Electrolytic, Vacuum, Gas, high-voltage capacitors) into adjustable capacitors without mechanical parts inside capacitors and provides broad ranges of changing the capacity of adjustable capacitors in electric circuits of direct and alternating current and in all types of Marx Generators. The method comprising the steps of: choosing the capacity of one capacitor bigger and connecting said capacitor in series with at least one or two other capacitors; connecting capacitor plates of these capacitors through devices, which change their electrical states; changing the states of said devices within charging and discharging said capacitors and the step of combining plates of said capacitors which ensures the lowest cost price of manufacturing said capacitors. The present invention can be used for controlling the maximum voltage of a load and for changing motor speed.

Figure 1:
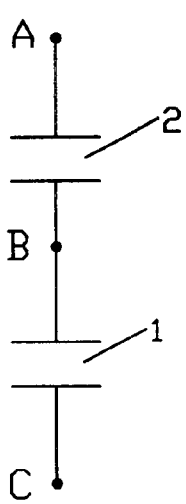

54 Claims, 13 Drawing Sheets a).

b).

a).

b).

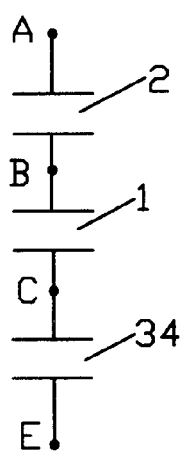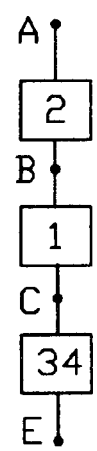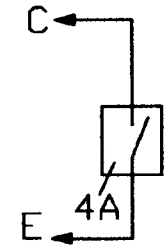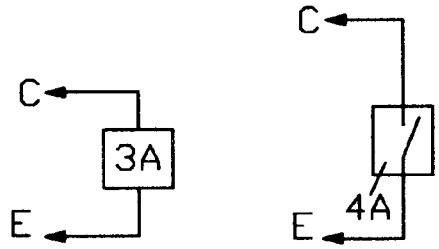
FIG.30　　FIG.31　　FIG.32　　FIG.33
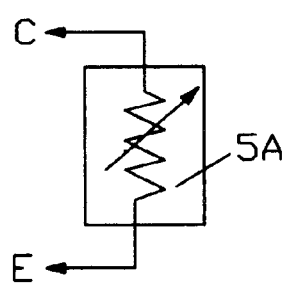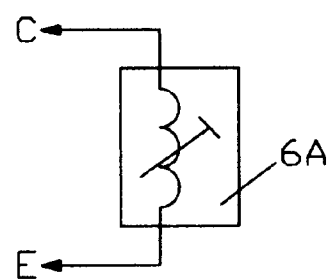
FIG.34　　FIG.35
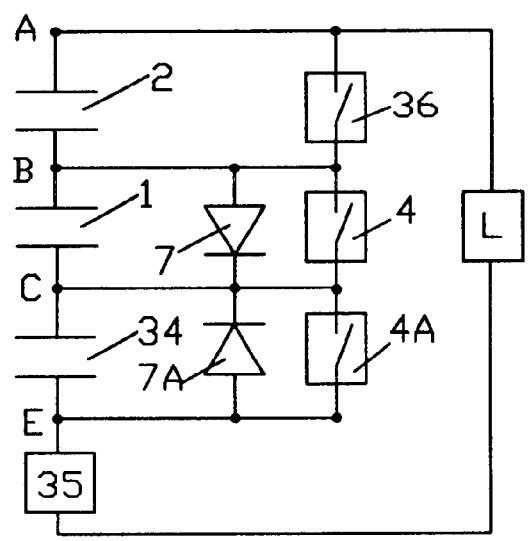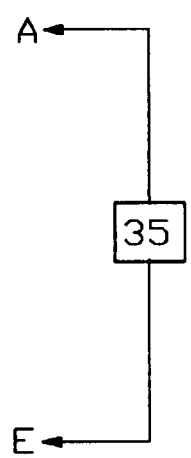
FIG.36　　FIG.37 a)

b).

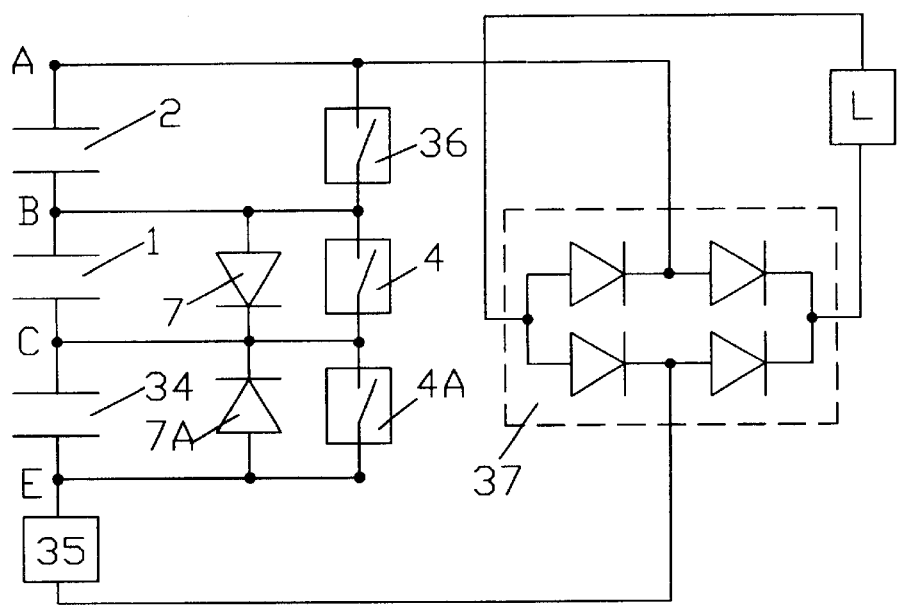
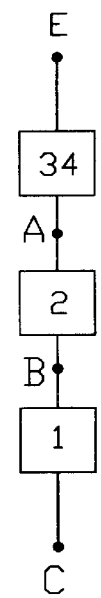
FIG39  FIG.40
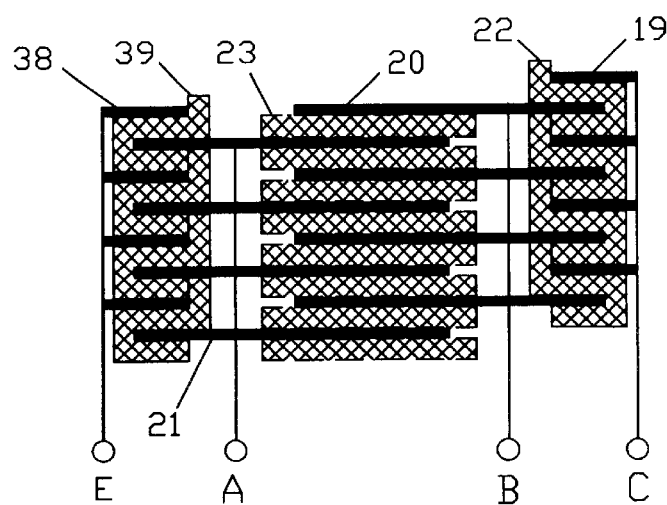
FIG.41

APPLICATION NUMBER 08/995,415

METHOD OF OBTAINING THE ADJUSTABLE CAPACITOR

The present invention relates to the methods of obtaining the adjustable capacitor for low-voltage and high-voltage.

Known mechanical method of obtaining an adjustable capacitor uses the step of changing distance between capacitor plates or the step of changing the active area of capacitor plates.

This method has following shortcomings:

It is difficult to make this capacitor hermetic;

The capacitor can change its electrical characteristics because it is not hermetic and in consequence of friction between moving parts;

It is not expedient to use a mechanical method for capacitors with a big capacity, for high-voltage capacitors, for Vacuum Capacitors and for Gas Capacitors;

It is not possible to use a mechanical method for changing capacities of Electrolytic Capacitors which plates are realized as spirals;

The peak of energy density is not high.

Examples of adjustable capacitors without mechanical parts are described in U.S. Pat. No 3,737,688, Cl. 310-2 and U.S.S.R Patent No 769650, Cl. H OI G 7/06. Both inventions have the step of creating a glow-discharge between capacitor plates and use two supplementary electrodes. In both inventions a capacity of a capacitor changes by changing quantity of free charges.

This method can not provide a wide range of changing a capacity of a capacitor and obviously can not be used for changing a capacity of all other types of capacitors and the peak of energy density can not be high.

An object of the present invention is to transform all types of the capacitors (including Electrolytic, Vacuum, high-voltage capacitors) into adjustable capacitors without mechanical parts and to provide broad ranges of changing the capacity of the adjustable capacitor. This first object is attained by steps of:

choosing the capacity of a first capacitor or a first group of capacitors less than the capacity of a second capacitor or a second group of capacitors;

connecting at least said first and second capacitors or said first and second groups of capacitors in series;

connecting capacitor plates of said first capacitor or said first group of capacitors or their terminals through at least one cell, which changes its resistance or reactance, and/or at least one switching device and/or at least one adjustable resistance and/or at least one adjustable reactance device(s);

then converting at least one of said cells or switching devices or adjustable resistance or adjustable reactance devices into a non-conducting state or into a state with higher impedance within charging of said second capacitor or said second group of capacitors;

and then connecting electrically the capacitor plates of said first capacitor or said first group of capacitors or their terminals.

It is possible to change the capacity of the adjustable capacitors differently:

by changing the duration of a period of time when at least one of said cell or switching device or adjustable resistance or adjustable reactance device is in a non-conducting state or in a state with higher impedance;

by changing the value of resistance and/or reactance of supplementary adjustable cell and/or supplementary adjustable device(s);

by changing the value of the voltage of a voltage source.

Another object of the invention is to provide discharge time of Adjustable Vacuum Capacitors, Adjustable Gas Capacitors and other capacitors during a period of time which is of the order of microseconds and less. This second object is attained by steps of:

detecting the voltage of said first capacitor or said first group of capacitors within its discharging;

receiving signals of detecting;

using said signals in said step of connecting electrically the capacitor plates of said first capacitor or said first group of capacitors;

and said step of connecting electrically, the capacitor plates of said first capacitor or said first group of capacitors, is realized as a short circuit.

Another object of the invention is to obtain Adjustable Electrolytic Capacitors, Vacuum Capacitors, Gas Capacitors, Ceramic Capacitors, Mica Capacitors, etc. which can be easily manufactured. This third object is attained by step of:

combining a capacitor plate of said first capacitor with a capacitor plate of said second capacitor, which have the same potential, or combining the capacitor plates of said first group of capacitors with the capacitor plates, which have the same potential, of said second group of capacitors.

Another object of the invention is to obtain adjustable capacitors with the higher energy density. This fourth object is attained by the solution:

in which the area of the non-combined capacitor plate or plates, of said first capacitor or said first group of capacitors, is realized less than the area of the combined capacitor plate or combined capacitor plates;

and by steps of: installing said all capacitor plates in a hermetic volume;

filling said hermetic volume by at least a gas with a higher pressure than the atmospheric pressure or creating a vacuum in said hermetic volume with a pressure between $10^{-8}$ and 0,6 Pa.

Another object of the present invention is to obtain adjustable capacitors which can multiply a voltage of said voltage source. This fifth object is attained by steps of:

choosing at least two other capacitors or two other groups of capacitors accordingly equal to said first and second capacitors or accordingly equal to said first and second group of capacitors;

connecting said two other capacitors or two other groups of capacitors in series;

repeating on said other capacitors or on said other groups of capacitors all steps which are realized with said first and second capacitors or all steps which are realized with said first and second groups of capacitors;

connecting said first, second and said other capacitors or said first, second groups of capacitors and said other groups of capacitors in series during discharging of said all capacitors.

Another object of the invention is to obtain adjustable capacitors for electric circuit of alternating voltage. This sixth object is attained by steps of:

connecting a third capacitor or third group of capacitors with said first capacitor or first group of capacitors or with second capacitor or second group of capacitors in series;

connecting the capacitor plates of said third capacitor or said third group of capacitors by a first short circuit during a period of time when the voltage direction is positive;

then connecting the capacitor plates of said first capacitor or said first group of capacitors by a second short circuit during a period of time when the voltage direction is negative;

connecting capacitor plates of said third capacitor or said third group of capacitors or their terminals through at least one additional cell, which changes its resistance or reactance, and/or at least one additional switching device and/or at least one additional adjustable resistance and/or at least one additional adjustable reactance device(s);

then converting at least one of said additional cells or additional switching devices or additional adjustable resistance or additional adjustable reactance devices into a non-conducting state or into a state with higher impedance within charging of said second capacitor or said second group of capacitors;

and then connecting electrically the capacitor plates of said third capacitor or said third group of capacitors or their terminals.

Another object of the invention is to obtain adjustable capacitor with possibility to change the maximum voltage of charging the adjustable capacitor in alternating-current circuit. This seventh object is attained by steps of:

charging and discharging said capacitors or said groups of capacitors through at least one load or through at least one load and rectifier;

connecting capacitor plates of said second capacitor or second group of capacitors or their terminals by a third short circuit and then breaking said third short circuit.

Figure 2:
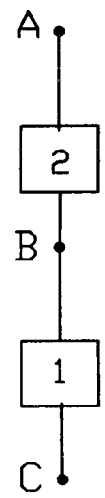
Figure 3:
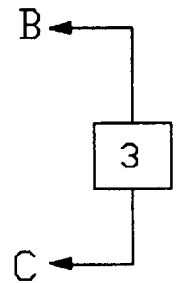
Figure 4:
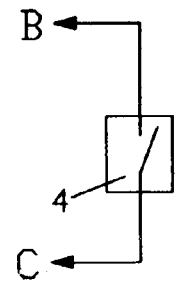
Figure 5:
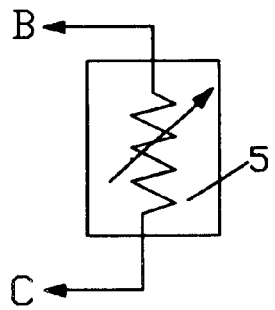
Figure 6:
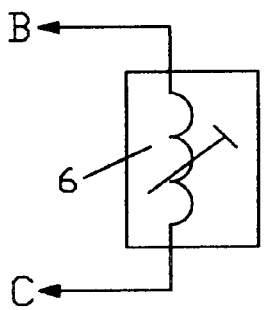
Figure 6:
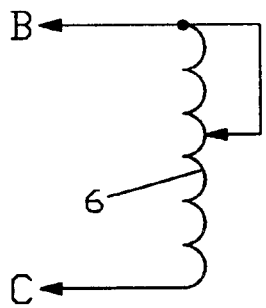
Figure 7:
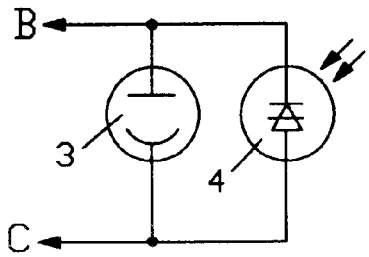
Figure 8:
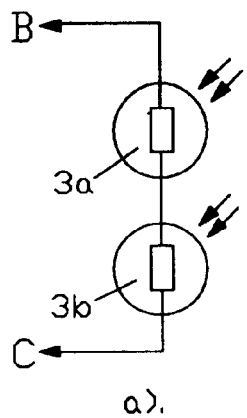
Figure 8:
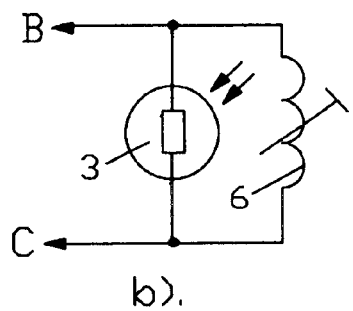
Figure 9:
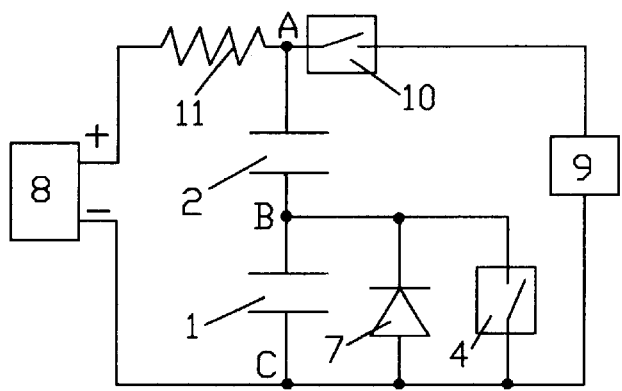
Figure 10:
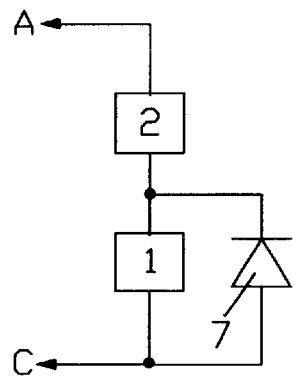
Figure 11:
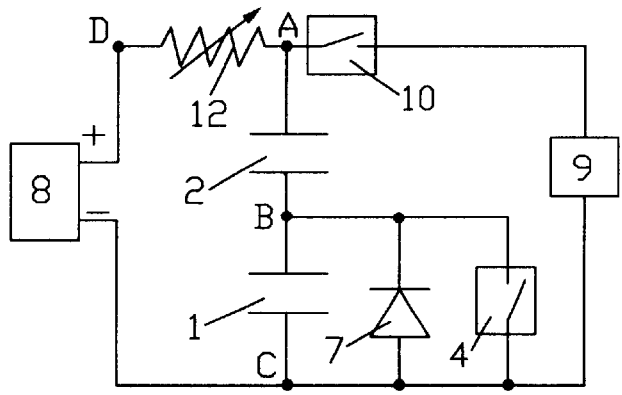
Figure 12:
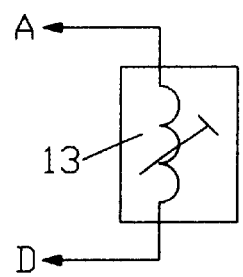
Figure 13:
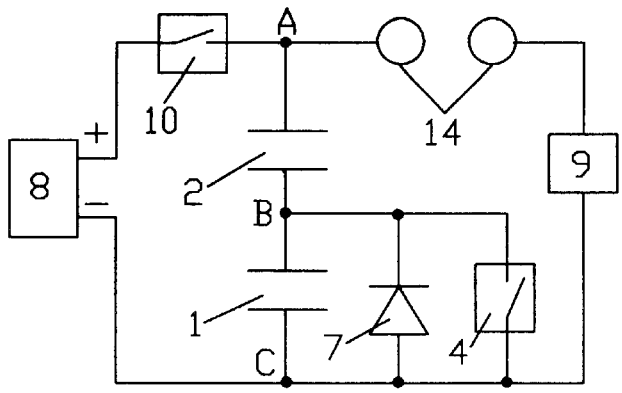
Figure 14:
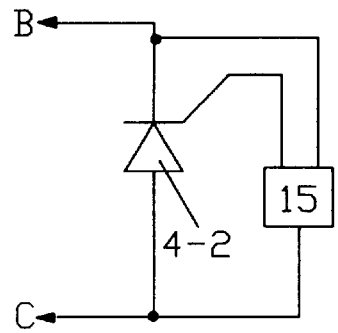
Figure 15:
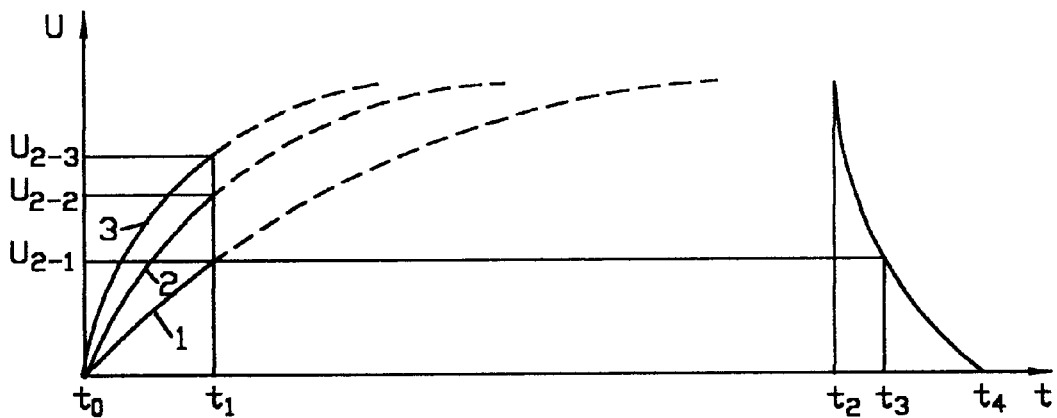
Figure 16:
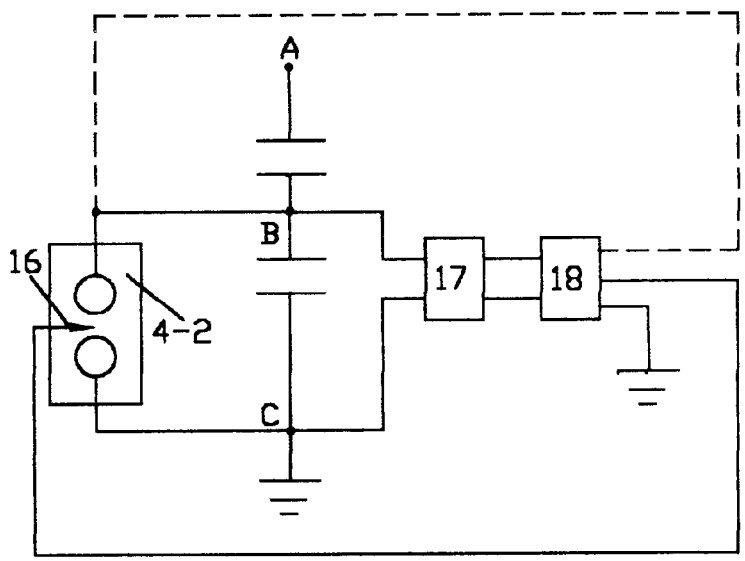
Figure 17:
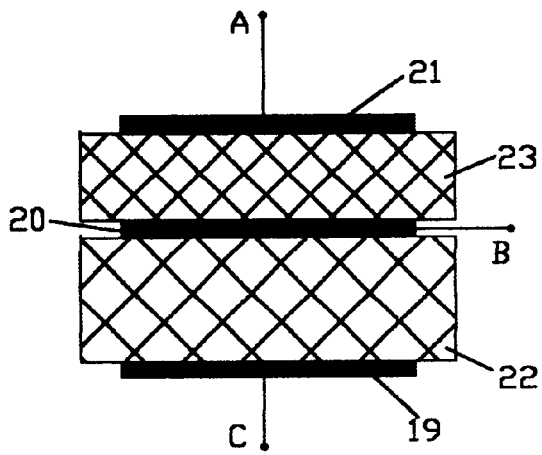
Figure 18:
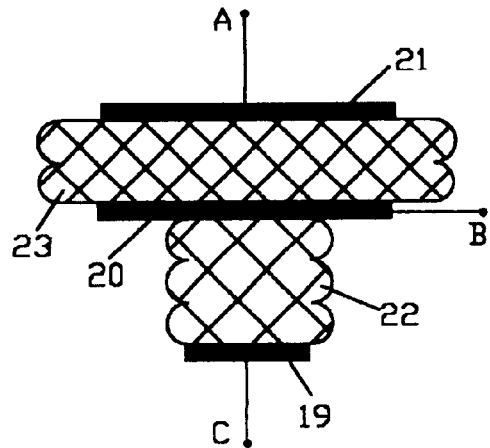
Figure 19:
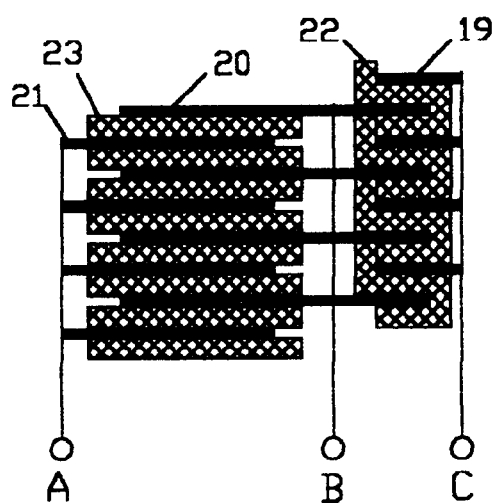
Figure 28:
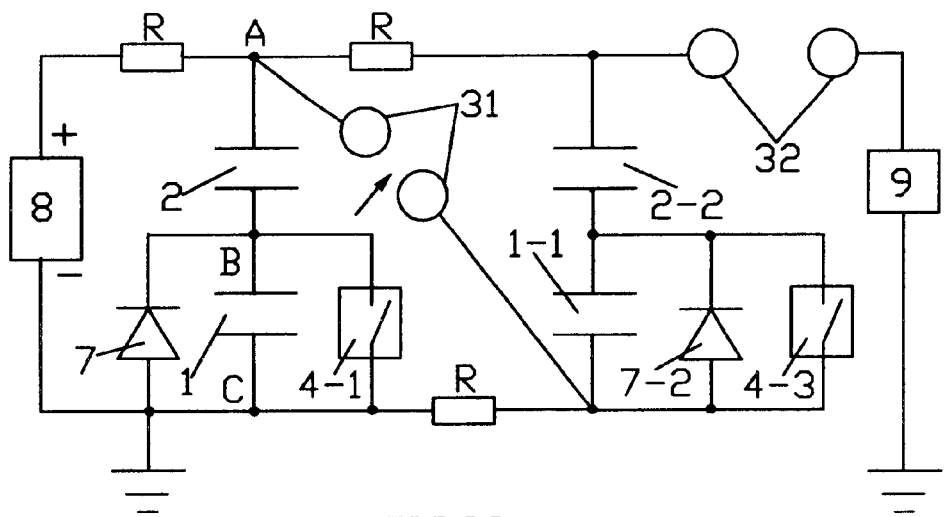
Figure 29:
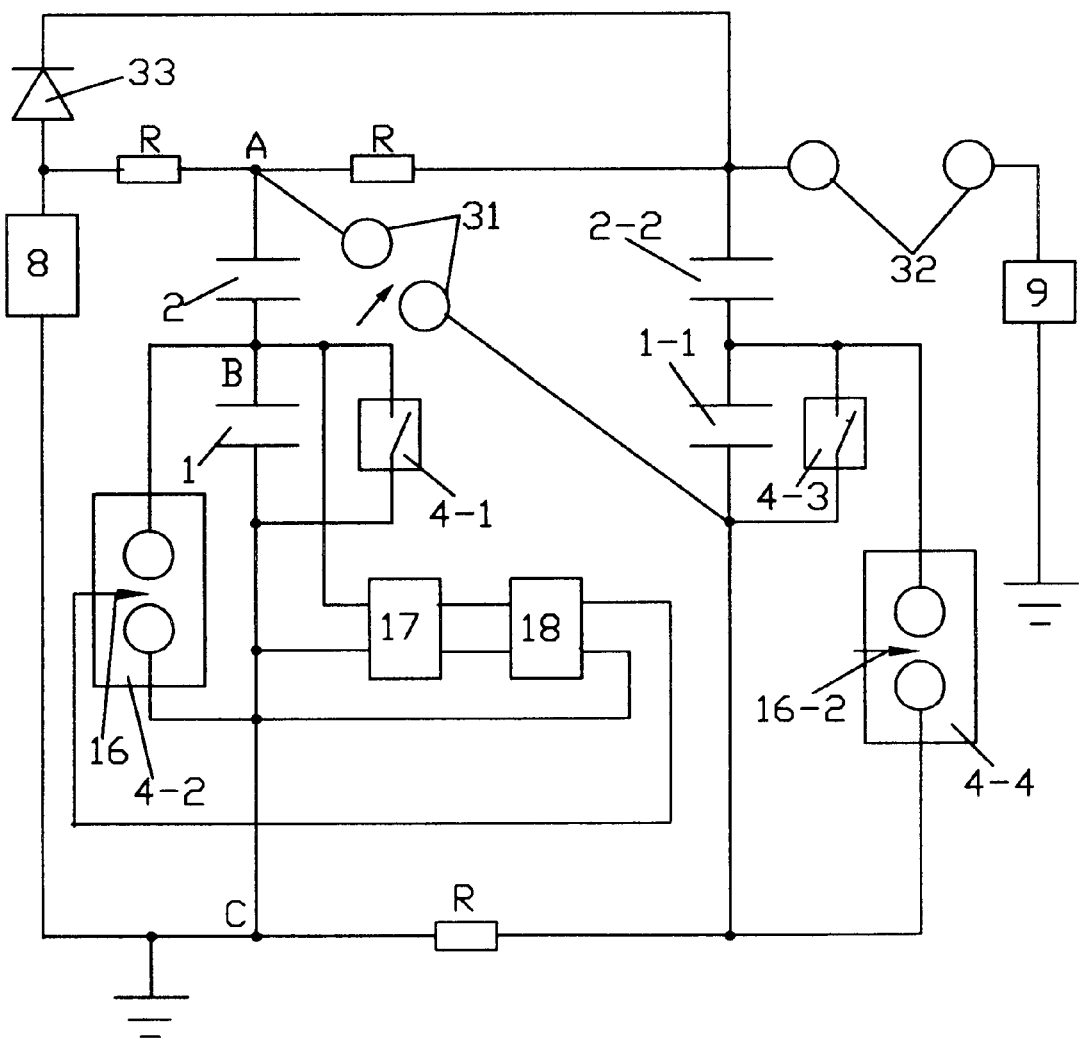
Figure 38:
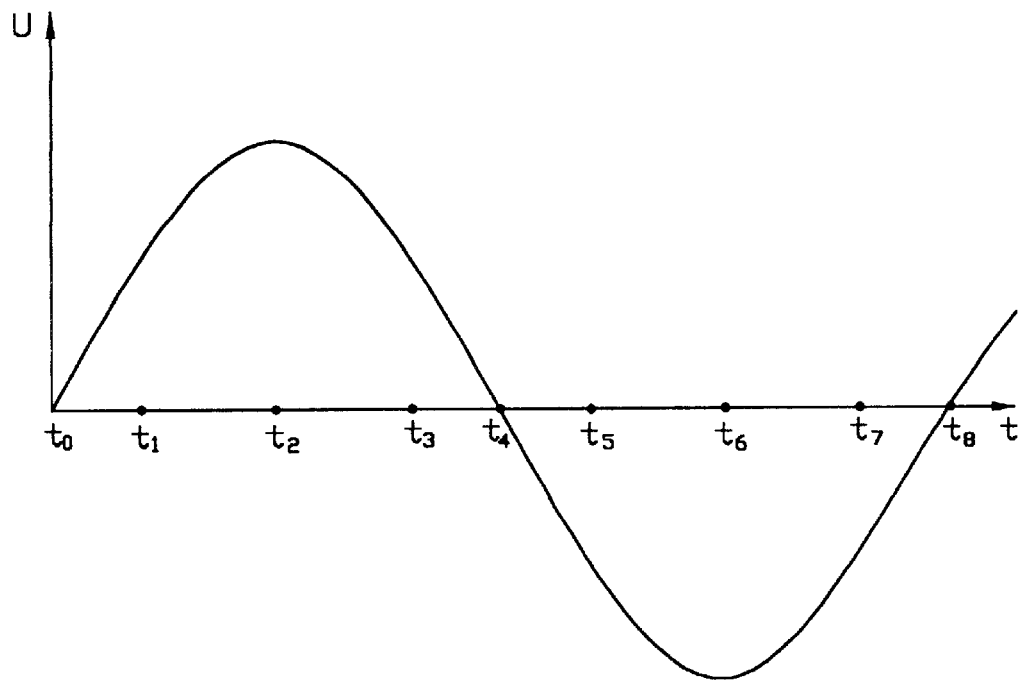
Figure 38:
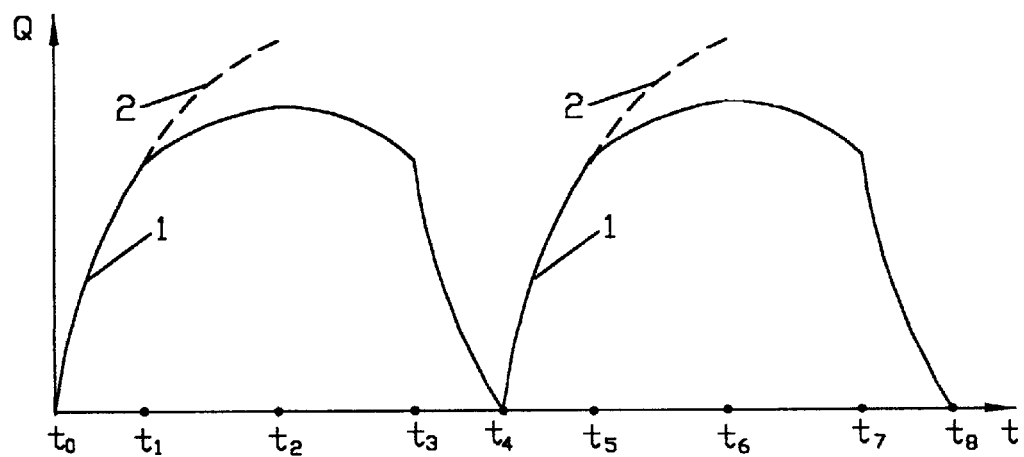
Figure 42:
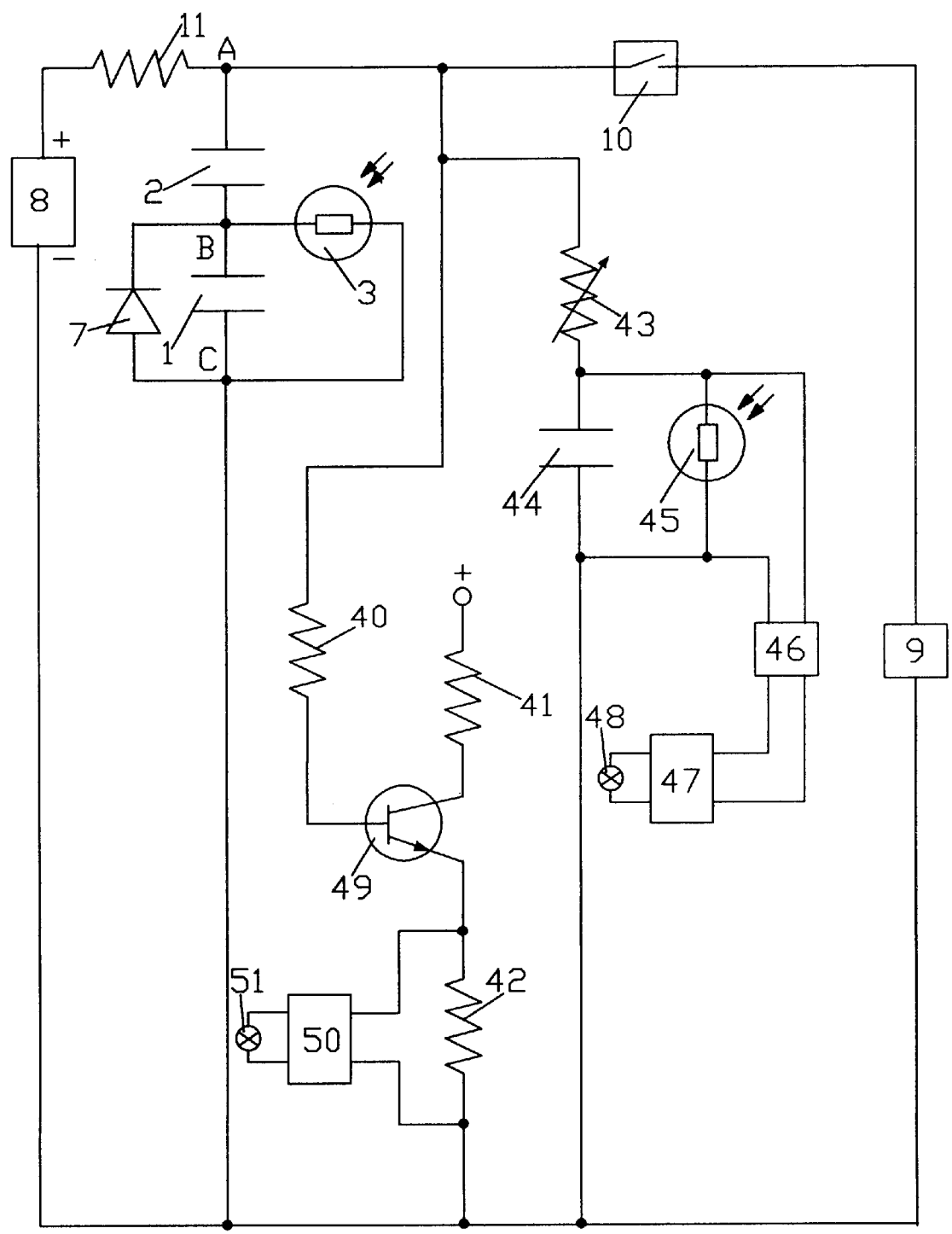
Figure 43:
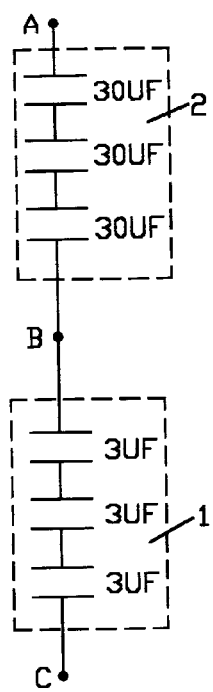
Figure 44:
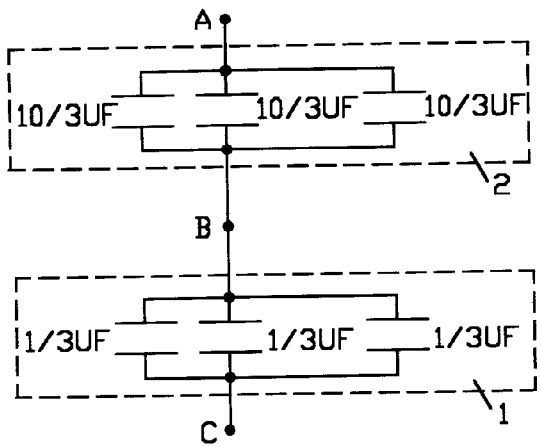
Figure 45:
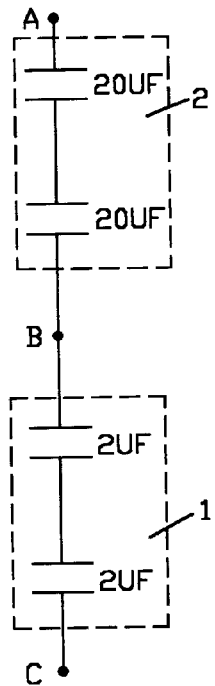
Figure 46:
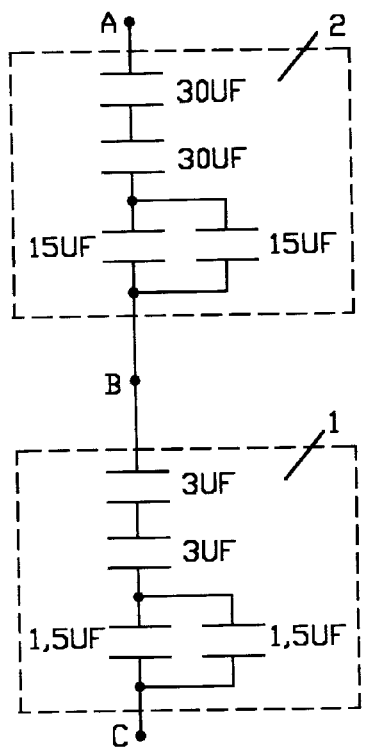
Figure 47:
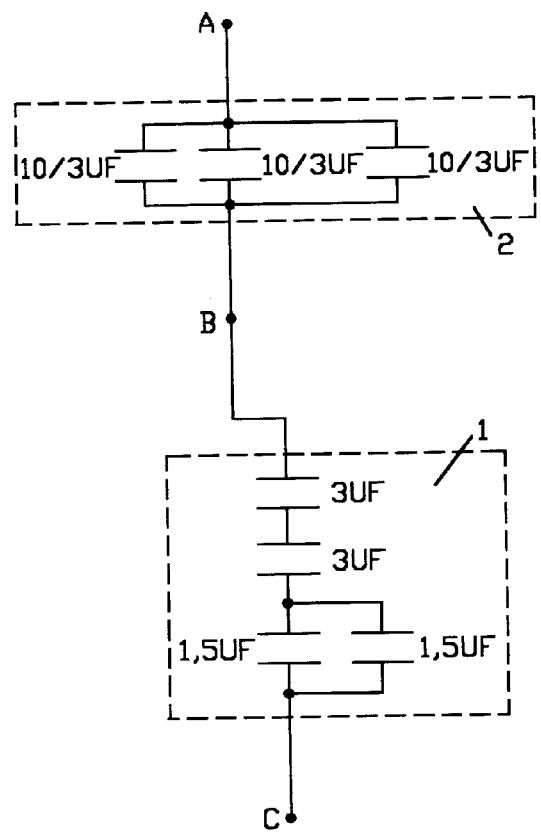

The invention is hereinafter described with reference to the accompanying drawing in which:

FIG. 1 and FIG. 2 illustrate the step of connecting at least first 1 and second 2 capacitors or first 1 and second 2 groups of capacitors in series;

FIG. 2, FIG. 3, FIG. 4, FIG. 5, FIG. 6, FIG. 7 and FIG 8 illustrate the step of connecting capacitor plates of said first capacitor 1 or said first group of capacitors 1 or their terminals through at least one cell 3 (FIG. 3 and FIG. 7), which changes its Resistance or reactance and/or at least one switching device 4 (FIG. 4 and FIG. 7) and/or at least one adjustable resistance 5 (FIG. 5) and/or at least one adjustable reactance 6 device(s<)(FIG. 6a and FIG. 6b). As a cell, which changes its resistance or reactance can be used: a photoconducting cell or cells 3a, 3b (FIG. 8), a photoelectric cell 3 (FIG. 7), a photorelay, a photodiode, a material which changes its resistance with changing in temperature, for example $VO_2$. As a switching device 4 can be used: an electronic switching device (for example -photo-thyristor 4, FIG. 7), a triode, a thyratron, a gas-discharge switching device or a mechanical switching device when electric charge time constant of the second capacitor 2 or the second group of capacitors 2 is big;

FIG. 9, FIG. 10 and FIG. 42 explain the steps of changing the capacity of the adjustable capacitor by changing the duration of a period of time when at least one of said cell or the switching device 4 or the adjustable resistance device is in a non-conducting state;

FIG. 11, FIG. 12 and FIG. 15 explain the steps of: connecting a voltage source 8 through at least one supplementary cell, which changes its resistance or reactance, and/or through at least one supplementary adjustable resistance 12 or reactance 13 devices with capacitor plates, which do not have the same potential, of the first 1 and the second 2 capacitors or with capacitor plates, which do not have the same potential, of the first 1 and second 2 groups of capacitors; and changing the capacity of the adjustable capacitor by changing the value of resistance and/or reactance of said supplementary adjustable cell and/or said supplementary adjustable device(s) 12 and 13. FIG. 5 explains process of charging the second capacitor 2 or process of charging the second group of capacitors 2 when the resistance 12 has different values. A switching device 10 of a load 9 provides discharge of said capacitors in demanded time;

FIG. 13 and FIG. 14 explain the steps of: connecting the load 9 through a threshold switch 14 with capacitor plates, which do not have the same potential, of the first 1 and the second 2 capacitors or with capacitor plates, which do not have the same potential, of the first 1 and the second 2 groups of capacitors; choosing the maximum voltage of the voltage source 8 more than the started voltage of the threshold switch 14; and changing the capacity of the adjustable capacitor by changing the value of the voltage of the voltage source 8. As a threshold switch 14 can be used a spark gap;

In FIG. 9, FIG. 10, FIG. 11 and FIG. 13 said step of connecting electrically the capacitor plates of the first capacitor 1 or the first group of capacitors 1 (FIG. 10), is realized through at least one diode 7 which is installed against current of charging of the first capacitor 1 or the first group of capacitors 1. A thyristor 4-2 (FIG. 14), with control unit 15, can be used instend of the diode 7;

FIG. 16 explains the steps of: detecting the voltage of the first capacitor 1, by a detector of voltage 17, within its discharging; receiving signals of detecting and using said signals ( by a control unit 18 of the arrester 4-2) in the step of connecting electrically the capacitor plates of the first capacitor 1;

In FIG. 17, FIG. 18, FIG. 19, FIG. 20, FIG. 21, FIG. 22, FIG. 23, FIG. 24, FIG. 25, FIG. 26 and FIG. 27 the first 1 and second 2 capacitors have a combined plate 20 or combined plates 20. These realizations include: non-combined capacitor plates 19 and 21 of the first 1 and the second 2 capacitors; an insulator 22 of the first capacitor 1; an insulator 23 of the second capacitor 2; an insulator 24; insulators 25 and 26 of a gas or a vacuum adjustable capacitor; a chamber 27; an opening 28; coolers 29 and conductors 30;

FIG. 28 and FIG. 29 explain the steps which multiply a voltage of the voltage source 8 and ensure high ranges of changing the capacity of the adjustable capacitor. These realizations include: two other capacitors 1-1 and 2-2; arresters 31 and 32; at least one diode 33; resistances R; switching devices 4-1 and 4-3; arresters 4-2 and 4-4 and diode 7-2. As an arrester can be used a spark gap;

FIG. 30 and FIG. 31 illustrate the step of connecting the first 1, second 2 and a third 34 capacitors or the first 1, second 2 and third 34 groups of capacitors in series;

FIG. 31, FIG. 32, FIG. 33, FIG. 34 and FIG. 35 illustrate the step of connecting capacitor plates of the third capacitor 34 or the third group of capacitors 34 or their terminals through at least one additional cell 3A (FIG. 32), which changes its resistance or reactance, and/or at least one additional switching device 4A (FIG. 33), and/or at least one additional adjustable resistance 5A (FIG. 34), and/or at least one additional adjustable reactance 6A (FIG. 35) device(s);

FIG. 36, FIG. 37, FIG. 38 and FIG. 39 explain the steps which are necessary for obtaining the adjustable capacitor in an electric circuit of alternating voltage. These realizations include: an additional switching device 4A; a voltage source 35, a switching device 36 and a rectifier 37;

In FIG. 40 the third group of capacitors is connected with the second group of capacitors in series;

In FIG. 41 the third 34 and the second 2 capacitors have combined plates 21. These realizations include non-combined capacitor plates 38 and an insulator 39 of the third capacitor;

FIG. 42 illustrates a second realization which ensures changing the capacity of the adjustable capacitor by changing the duration of a period of time when at least one cell is in a non-conducting state or in a state with higher impedance. This realization includes: a transistor switch 49 with resistances 40, 41 and 42; an adjustable resistance 43; a capacitor 44; a photoconductive cell 45; a threshold switch 46; triggers 47 and 50; light sources 48 and 51.

The method of achieving the purpose of changing the capacity of the adjustable capacitor, by changing the duration of a period of time when the switching device 4 is in a non-conducting state, is demonstrated below for the realization shown in FIG. 9. $t_0$ (FIG. 15) is a moment of switching on the voltage source 8. In the moment $t_0$ or before the moment $t_0$, the step of connecting the capacitor plates of the first capacitor 1 is realized by switching on the switching device 4. In a moment $t_1$ (FIG. 15), the step of converting the switching device 4 into a non-conducting state is realized by switching off the switching device 4. The charging of the first capacitor 1 begins at this moment $t_1$.

A period of time $\Delta t$, when the switching device 4 is in a non-conducting state, within charging of the second capacitor 2, is given by the following condition:

$$0 \leq \Delta t \leq 5\tau \tag{1}$$

where: $R_{11} \times C_2 = \tau$ is electric charge time constant of the second capacitor 2; $R_{11}$ is the resistance of the resistance 11 (FIG. 9); $C_2$ is the capacity of the second capacitor 2.

In a moment $t_F$ ($t_F - t_0 < 5R_{11} \times C_2$), the process of charging the capacitors 1 and 2 is finished. At this moment $t_F$ or later in a moment $t_2$, the step of discharging the adjustable capacitor is started by switching on the switching device 10 (FIG. 9). In a moment $t_3$ (FIG. 15), the process of discharging the first capacitor 1 is finished and the step of connecting electrically the capacitor plates of the first capacitor 1 is realized by diode 7.

During a period of time $\Delta t_2 = t_4 - t_3$, the step of discharging the second capacitor 2 is realized through the diode 7. In a moment $t_4$, the process of discharging the second capacitor 2 is finished. In this moment $t_4$, described above process of charging the adjustable capacitor can be repeated by switching off the switching device 10.

In case of $\Delta t = 5R_{11} \times C_2$, the capacity of the adjustable capacitor $C_A$ is given by following expression:

$$C_A = (C_1 \times C_2)/(C_1 + C_2) \tag{2}$$

where $C_1$ and $C_2$ are the capacities of the first 1 and the second 2 capacitors.

In case of $\Delta t = 0$, the capacity of the adjustable capacitor $C_A$ is given by $$C_A = C_2 \tag{3}$$

Therefore, by changing the duration of the period of time $\Delta t$ (when the switching device 4 is in a non-conducting state) one can change the capacity of the adjustable capacitor $C_A$ within limits:

$$(C_1 \times C_2)/(C_1 + C_2) \leq C_A \leq C_2 \tag{4}$$

After finishing process of charging the adjustable capacitor, the energy of the adjustable capacitor $W_A$ and voltages of capacitors are given by the following expressions:

$$W_A = C_1 \times U_1^2/2 + C_2 \times U_2^2/2 \tag{5}$$

$$U_S = U_1 + U_2 \tag{6}$$

$$W_A = C_A \times (U_1 + U_2)^2/2 \tag{7}$$

$$U_1 = 1/C_1 \times \int_0^{\Delta t} i \times dt \tag{8}$$

Where: $U_1$ and $U_2$ are the voltages of the first 1 and the second 2 capacitors; $U_S$ is the voltage of the voltage source 8; $C_A$ is the capacity of the adjustable capacitor; i instantaneous current; $\Delta t$ the duration of a period of time when the switching device 4 is in a non-conducting state.

In case of $C_1 < C_2$, it follows from above expressions (4), (5), (6), (7), (8) that:

the more $C_2/C_1$ the more range of changing $C_A$;

in case of $\Delta t = 5\tau$, $C_A$ is of the order of $C_1$;

the more $\Delta t$ the less $C_A$; Consequently, in case of $C_2/C_1 = 10$ one can change $C_A$ approximately 11 times, in case of $C_2/C_1 = 1000$ one can change $C_A$ approximately 1000 times etc. Mentioned results are the same for the first 1 and the second 2 groups of capacitors connected in series (FIG. 10 and FIG. 9). Therefore, the method offered provides the revolutionary broad ranges of changing the capacity of the adjustable capacitor.

The method of achieving the purpose of changing the capacity of the adjustable capacitor, by changing the value of the supplementary adjustable resistance 12 or the supplementary adjustable reactance 13, is demonstrated below for the realization shown in FIG. 11 and FIG. 12. Achieving this purpose includes the step of connecting a voltage source 8 with the capacitor plates, which do not have the same potential, of the first 1 and the second 2 capacitors through at least one supplementary adjustable resistance 12 and/or at least one supplementary adjustable reactance 13 device(s). Curves 1, 2 and 3 (FIG. 15) demonstrate the process of charging the second capacitor 2 (FIG. 11) when the switching device 4 is in a conducting state. Dotted lines 1, 2 and 3 (FIG. 15) demonstrate the process of charging the second capacitor 2 (FIG. 11) when the switching device 4 is on all the time when charging the second capacitor 2. The values of supplementary adjustable resistance 12 for curves 1, 2 and 3 are accordingly equal to $R_{12-1}$, $R_{12-2}$ and $R_{12-3}$. Their values are given by conditions $$R_{12-3} < R_{12-2} < R_{12-1},$$

$$R_{12-1} = R_{11} \tag{9}$$

When the switching device 4 is in a conducting state the process of charging the second capacitor 2 is given by following expression $$U_2 = U_S \times (1 - e^{-t/R_{12} \times C_2}) \tag{10}$$

where $R_{12}$ is the resistance of the resistance 12 (FIG. 11). $U_{2-1}$, $U_{2-2}$ and $U_{2-3}$ (FIG. 15) are the voltages of the second capacitor 2 when $R_{12}$ is accordingly equal to $R_{12-1}$, $R_{12-2}$ and $R_{12-3}$.

It follows from above expressions (5), (6), (7), (10) that:

the more $R_{12}$ the less the voltage $U_2$ (FIG. 15) in the same moment of the process of charging $C_2$;

the more $R_{12}$ the less $C_A$, when the step of converting the switching device 4 into a non-conducting state is realized after the same time delay $\Delta t_1$, for example: $\Delta t_1 = t_1 - t_0$ (FIG. 15).

Consequently, one can change the capacity of the adjustable capacitor $C_A$ by changing the value of the supplementary adjustable resistance 12. In case of changing the capacity of the adjustable capacitor by changing the value of the supplementary adjustable reactance 13 (FIG. 12) there is not energy loss.

The method of achieving the purpose of changing the capacity of the adjustable capacitor, by changing the value of the voltage of the voltage source 8 is demonstrated below for the realization shown in FIG. 13 and FIG. 14. Achieving this purpose includes the steps of:

connecting the capacitor plates of the first 1 and the second 2 capacitors through the voltage source 8;

connecting the load 9 with the capacitor plates of the first 1 and the second 2 capacitors through the threshold switch 14;

choosing the maximum voltage of the voltage source 8 more than the started voltage of the threshold switch 14.

The values of voltages are given by following conditions:

$$U_S > U_B \quad (11)$$

$$U_B = U_1 + U_2 \quad (12)$$

where $U_B$ is the started voltage of the threshold switch 14 which for this realization equal to the breakdown voltage of the arrester 14.

It follows from above expressions (5), (7), (10), (11), (12) that:

the more $U_S$ the more $U_2$ in a moment $t_1$ when the step of converting the switching device 4 into a non-conducting state is realized by switching off the switching device 4;

the more $U_S$ the less $U_1$ in a moment of breakdown of the arrester 14;

the more $U_S$ the more $C_A$ when the step of converting the switching device 4 into a non-conducting state is realized in the same moment, for example in a moment $t_1$ (FIG. 15).

Consequently, one can change the capacity of the adjustable capacitor $C_A$ by changing the value of the voltage of the voltage source 8.

In case of a big discharging current, the step of connecting electrically the capacitor plates of the first capacitor 1 can be realized by the thyristor 4-2 (FIG. 14) or the arrester 4-2 (FIG. 16). When the adjustable capacitor must be discharged during a period of time, which is of the order of microseconds and less, the step of connecting electrically the capacitor plates of the first capacitor 1 is realized by the arrester 4-2 (FIG. 16), with a starting electrode 16, or can be realized by a triode or a thyratron. The control unit 18 of the arrester 4-2 forms trigger pulses for the starting electrode 16. The control unit 18 can have 4 or 5 terminals (fifth terminal is showed as a dotted line). The step of detecting the voltage of the first capacitor 1 (FIG. 16) within it discharging is realized by the detector of voltage 17. The control unit 18 of the arrester 4-2 uses the signals of detecting in the step of connecting electrically the capacitor plates of the first capacitor 1. In a moment $t_3$ (FIG. 15), the arrester 4-2 is in a conducting state.

Figure 20:
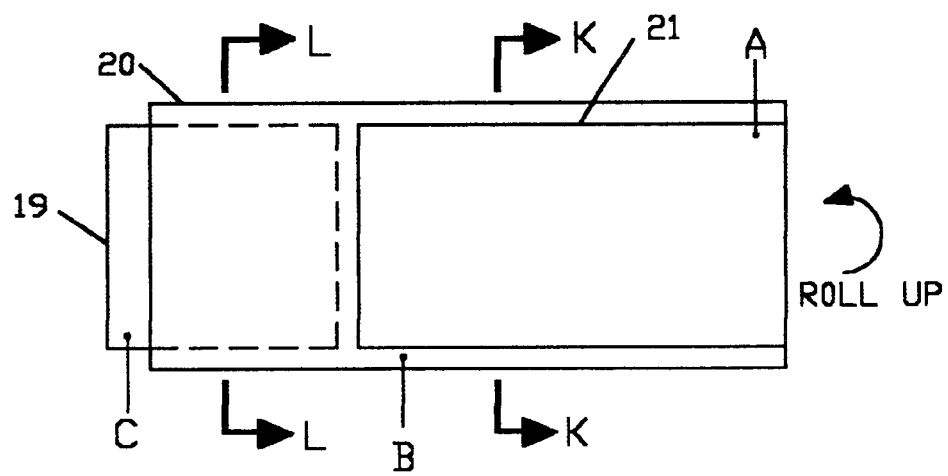
Figure 20:
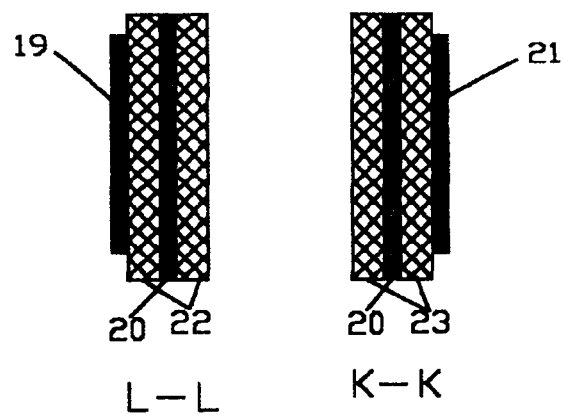
Figure 21:
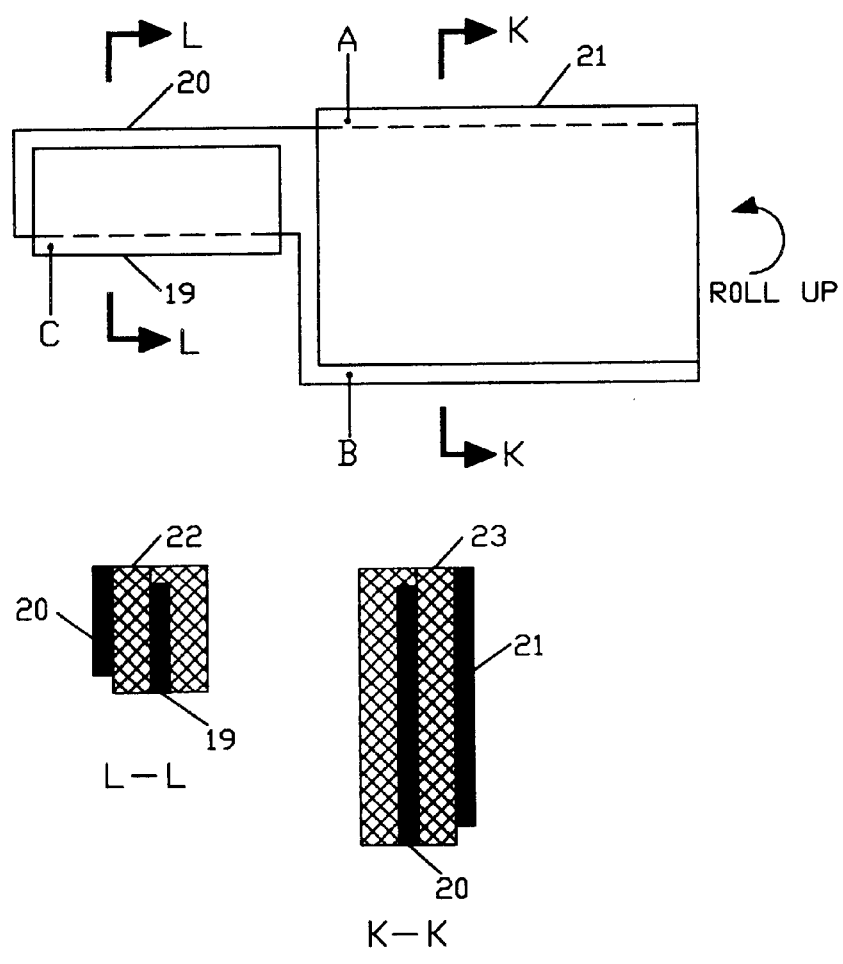
Figure 22:
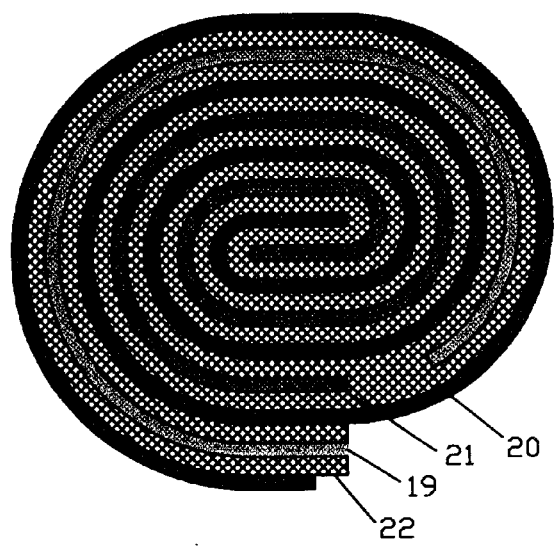
Figure 23:
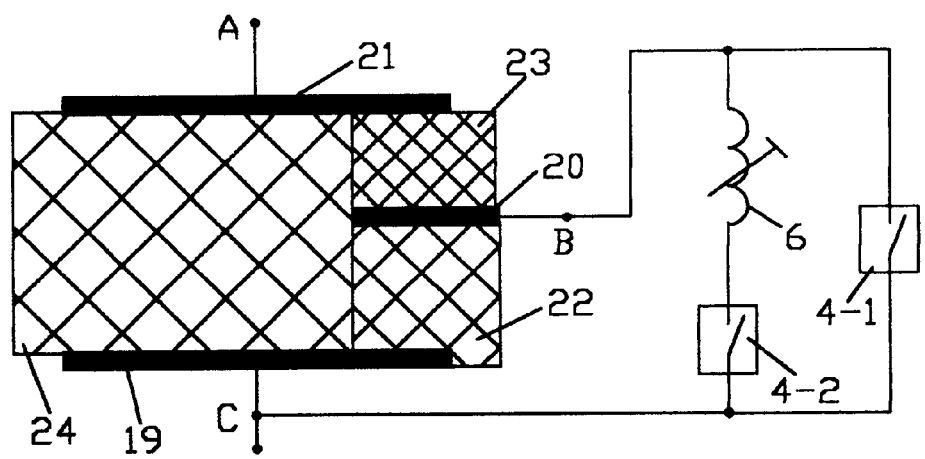
Figure 24:
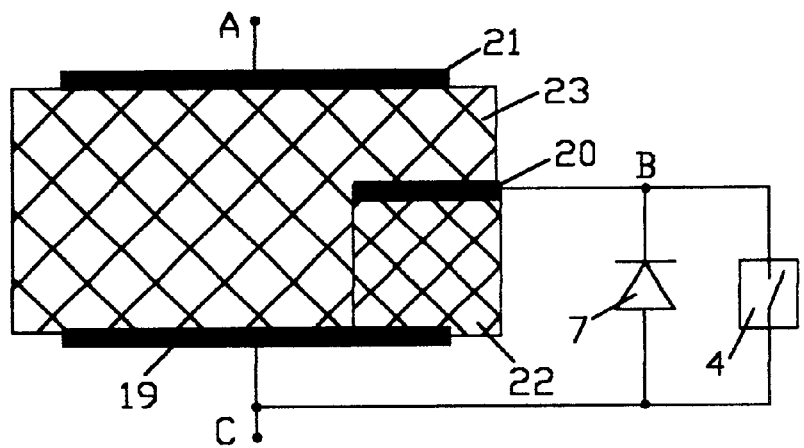
Figure 25:
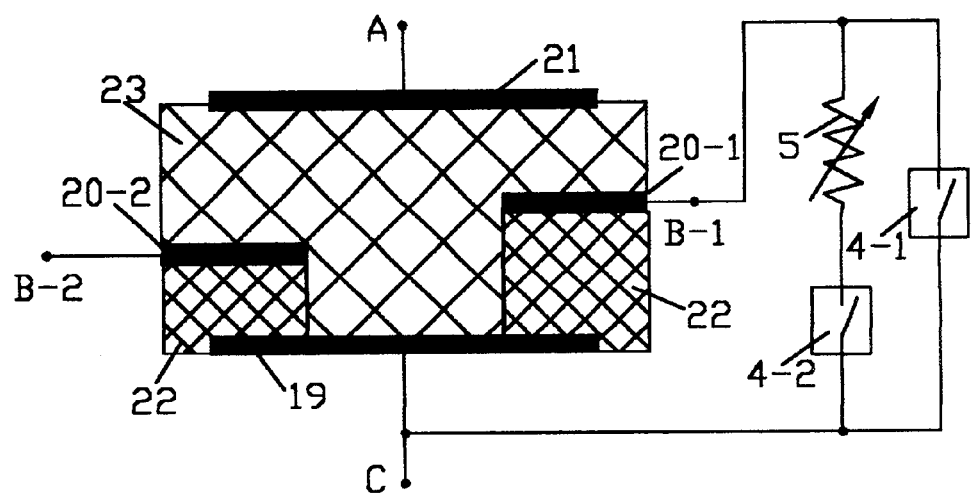
Figure 26:
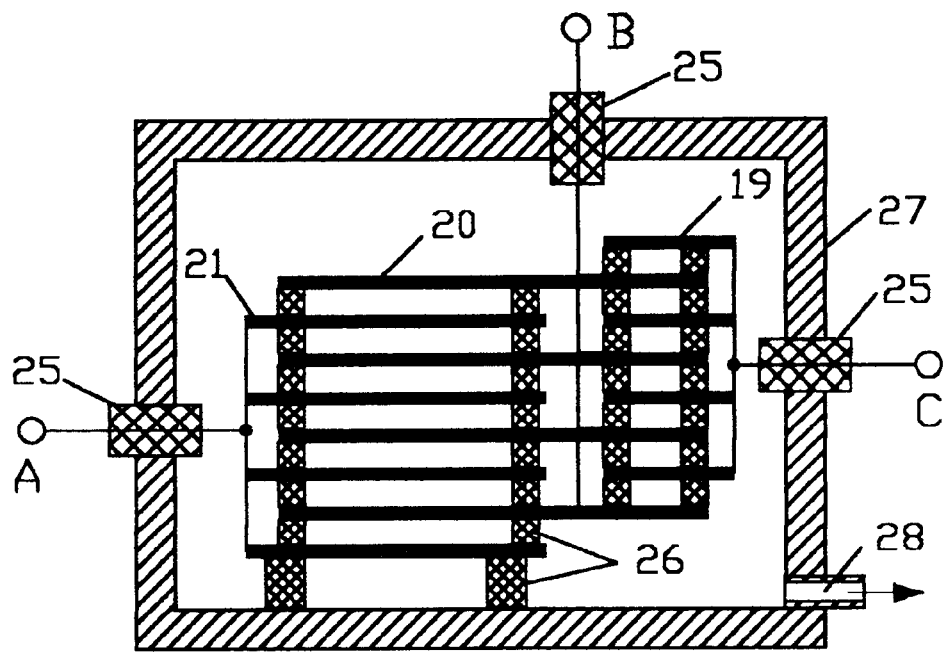
Figure 27:
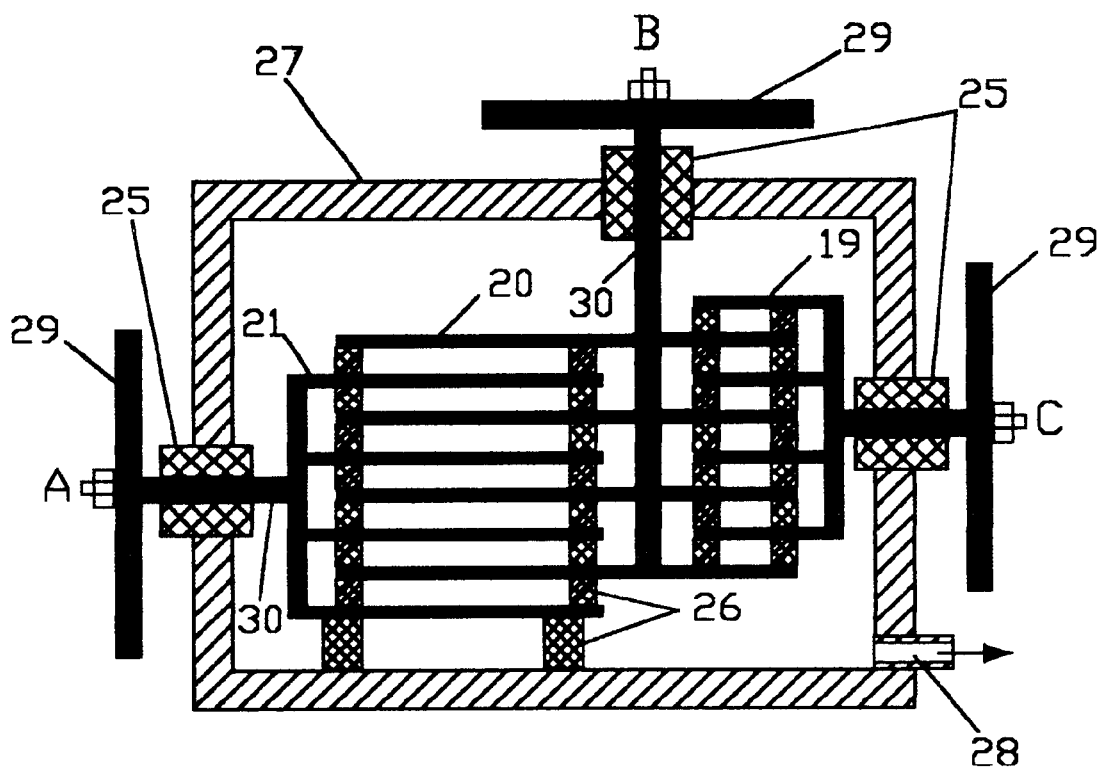

The step of combining a capacitor plate of the first capacitor 1 with a capacitor plate of the second capacitor 2, which have the same potential, are demonstrated below for the different realizations:

1. The area of the combined capacitor plate 20 is equal to the area of each of the non-combined capacitor plates 21 and 22 (FIG. 17);
2. The area, of the non-combined capacitor plate 19 (FIG. 18, FIG. 20, FIG. 21, FIG. 22) or plates 19 (FIG. 19, FIG. 26, FIG. 27) of the first capacitor or the first group of capacitors, is realized less than the area of the combined capacitor plate 20 or the combined capacitor plates 20. This step, in case of using the same insulators 22 and 23 (examples: Oil Capacitors, Gas Capacitors, Vacuum Capacitors), ensures minimal dimensions;
3. The area of the combined capacitor plates 20 is realized bigger than the area of each of the non-combined capacitor plates 19 and 21 (FIG. 19, FIG. 20, FIG. 21, FIG. 22, FIG. 26, FIG. 27). This step ensures a high peak of energy density of the adjustable capacitor;
4. All capacitor plates are realized as spirals (FIG. 20, FIG. 21, FIG. 22). This step ensures a high peak of energy density of the adjustable capacitor, for example a high peak of energy density of Electrolytic adjustable capacitor (in this time Electrolytic adjustable capacitor does not exist);
5. The area of the combined capacitor plate 20 is realized less than the area of each of the non-combined capacitor plates 19 and 21 (FIG. 23, FIG. 24, FIG. 25). This step permits to change the capacity of the adjustable capacitor $C_A$ smoothly within a range which is of the order of $C_2$. Constructions of the first and second capacitors can have two or more combined plates (FIG. 25) and two or more different ranges of changing $C_A$;
6. The realizations shown in FIG. 17, FIG. 18, FIG. 23, FIG. 24 and FIG. 25 include the step of isolating the capacitor plates 19 and 20 of the first capacitor by at least one insulator 22 which has less permittivity than the permittivity of the insulator 23 (FIG. 17) of the capacitor plates of the second capacitor or insulators 23 and 24 (FIG. 23). As insulators 23 and/or 24 can be used $BaSnO_3$, $BaZrO_3$, $CaTiO_3$, etc. which have big permittivity. The step of isolating the capacitor plates 19 and 20 of the first capacitor by insulator 22, which has less permittivity than the permittivity of the insulator 23 (FIG. 17) and/or insulator 24, ensures the lowest cost price and broad ranges of the capacity of the adjustable capacitor $C_A$;
7. The steps of installing said all capacitor plates in a hermetic volume, filling said hermetic volume by at least a gas with a higher pressure than the atmospheric pressure or creating a vacuum in said hermetic volume with a pressure between $10^{-8}$ and 0,6 Pa, ensure a high peak of energy density of Gas and Vacuum Capacitors because:

between the vacuum pressure about 0,6 Pa and the atmospheric pressure, the electric strength of vacuum is less than 30 kV/cm;

the electric strength of the air, in case of normal atmospheric pressure, is about 30 kV/cm;

the more pressure of the air the more the electric strength of the air. For example, the electric strength of the air is about 380 kV/cm, in case of the pressure of the air about 15 atmosphere;

the less a vacuum pressure (less than 0,6 Pa) the more the electric strength of a vacuum. For example, the electric strength of the vacuum, with the pressure about 0,001 Pa, is about 200 kV/cm. The step of creating a vacuum with a low pressure ensures a high peak of energy density of the adjustable capacitor. It is possible to create a vacuum with a pressure about $10^{-8}$ Pa. The opening 28 (FIG. 26, FIG. 27) is closed after creating a vacuum inside of the chamber 27 or the opening 28 is closed after filling the chamber 27 by at least a gas (for example: by the gas $H_2$) with a higher pressure than the atmospheric pressure.

8. The step of cooling the capacitor plates by a cooling system or coolers 29 (FIG. 27), installed outside of the hermetic volume, increases allowable frequency of charging and discharging the adjustable capacitor. Said coolers are connected with capacitor plates 19, 20 and 21 by thick conductors 30 (FIG. 27), which have a high thermal conductivity (for example Cu). For vacuum capacitors, this step of cooling is more necessary. One can use a coolant for cooling the capacitor plates 19, 20 and 21. In this case, the plates 19, 20 and 21 can have hermetic passages for the coolant (inside themselves).

It follows from the above constructions that the step of combining a capacitor plate of the first capacitor with a capacitor plate of the second capacitor or combining the capacitor plates of the first group of capacitors with the capacitor plates of the second group of capacitors ensures the lowest cost price of manufacturing the first 1 and the second 2 capacitors.

The steps of choosing at least two other capacitors 1-1 and 2-2 (FIG. 28 and FIG. 29) accordingly equal to the first 1 and the second 2 capacitors, connecting said other capacitors 1-1 and 2-2 in series, repeating on the capacitors 1-1 and 2-2 all steps which are realized with the first 1 and the second 2 capacitors, connecting the first 1, the second 2 and other capacitors 1-1, 2-2 in series during discharging of said all capacitors 1, 2, 1-1, and 2-2 ensure:

obtaining a voltage $U_L$ on a load 9 about two times more than a voltage $U_S$ of a voltage source 8 with the revolutionary broad ranges of changing the capacity of the adjustable capacitor $C_A$.

$$U_L \approx 2U_S \tag{13}$$

When the number of other capacitors is equal to 2n (where n=2, 3, 4, 5 . . . , etc. )

$$U_L \approx U_S \times (1+n) \tag{14}$$

The step of connecting the first 1, the second 2 and the other capacitors 1-1, 2-2 in series and the step of discharging all capacitors 1, 2, 1-1 and 2-2 are realized by switching on the arrester 31 because:

$$2U_S > U_{B-32} \tag{15}$$

where $U_{B-32}$ is the breakdown voltage of the arrester 32.

The step of repeating on the capacitors 1-1 and 2-2 all steps which are realized with the first 1 and the second 2 capacitors is realized by the switching device 4-3 and the diode 7-2 (FIG. 28) or by the switching device 4-3 and the arrester 4-4 (FIG. 29). The realization in FIG. 29 ensures equal conditions of charging the first 1, the second 2 capacitors and the other 1-1, 2-2 capacitors. Therefore, the step of repeating, on the capacitors 1-1 and 2-2 all steps which are realized with the first 1 and the second 2 capacitors, can be realized in the same time with the steps on the first 1 and the second 2 capacitors. The diode 33 ( FIG. 29) protects the voltage source 8 during discharging of all said capacitors.

$$U_{B-33} > 2U_S \tag{16}$$

where $U_{B-33}$ is the breakdown voltage of the diode 33.

Known Marx Generators cannot change the capacity of capacitors. Consequently, the described above steps ensure transformation of all types of Marx Generators to new Generators with the revolutionary broad ranges of changing capacities of capacitors.

The method of obtaining the adjustable capacitor for alternating voltage, in which said steps of charging and discharging said capacitors or said groups of capacitors are realized through at least one load, is demonstrated in FIG. 36.

The method of obtaining the adjustable capacitor for alternating voltage, in which said steps of charging and discharging said capacitors or said groups of capacitors are realized through at least one load and rectifier, is demonstrated in FIG. 39.

FIG. 38*a* demonstrates an alternating voltage of the voltage source 35. Curve 1 (FIG. 38*b*) demonstrates charge variation Q of the second capacitor 2. Dotted line 2 demonstrates charge variation Q of the second capacitor 2 when the switching device 4 and 4A are on all the time when charging the second capacitor.

The method of obtaining the adjustable capacitor for alternating voltage is demonstrated below.

The third capacitor 34 is connected in series with the first capacitor 1 (FIG. 36, FIG. 39). In a moment $t_0$ (FIG. 38*a*), the step of connecting the capacitor plates of the third capacitor 34 by a first short circuit, during a period of time when the voltage direction is positive, is realized by switching on the additional switching device 4A. In this moment $t_0$, the step of connecting the capacitor plates of the first capacitor 1 is realized by switching on the switching device 4. $t_0$ is a moment of switching on the voltage source 35. The charging of the second capacitor 2 begins at this moment $t_0$ (FIG. 38*b*). In a moment $t_1$ (FIG. 38*a*), the step of converting the switching device 4 into a non-conducting state is realized by switching off the switching device 4. The charging of the first capacitor 1 begins at this moment $t_1$. In a moment $t_2$, the process of charging the capacitors 1 and 2 is finished and the process of discharging the capacitors 1 and 2 is started. In a moment $t_3$ (FIG. 38*b*), the process of discharging the first capacitor 1 is finished and the step of connecting electrically the capacitor plates of the first capacitor 1 is realized by the diode 7. During a period of time $\Delta t_2 = t_4 - t_3$, the step of discharging the second capacitor 2 is realized through the diode 7. In a moment $t_4$, the process of discharging the second capacitor 2 is finished. In this moment $t_4$, the step of connecting the capacitor plates of the first capacitor 1 by a second short circuit during a period of time when the voltage direction is negative is realized by switching on the switching device 4. The charging of the second capacitor 2 begins at this moment $t_4$ (FIG. 38*b*). During a period of time $\Delta t_3 = t_5 - t_4$, the step of connecting the capacitor plates of the third capacitor 34 through the additional switching device 4A is realized because the additional switching device 4A is in switching on state. In a moment $t_5$ (FIG. 38*b*), the step of converting the additional switching device 4A into a non-conducting state is realized by switching off the additional switching device 4A. The charging of the third capacitor 34 begins at this moment $t_5$. In a moment $t_6$, the process of charging the capacitors 2 and 34 is finished and the process of discharging the capacitors 2 and 34 is started. In a moment $t_7$ (FIG. 38*b*), the process of discharging the third capacitor 34 is finished and the step of connecting electrically the capacitor plates of the third capacitor 34 is realized by the additional diode 7A. During a period of time $\Delta t_4 = t_8 - t_7$, the step of discharging the second capacitor 2 is realized through the additional diode 7A. In a moment $t_8$, the process of discharging the second capacitor 2 is finished. At this moment $t_8$, the step of connecting the capacitor plates of the third capacitor 34 by a first short circuit during the period of time when the voltage direction is positive is repeated.

Described realizations shown in FIG. 36 and FIG. 39 can be used for controlling the maximum voltage of charging the adjustable capacitor $U_A$. One can change $U_A$ by changing the duration of a period of time $t_1 - t_0$ and $t_5 - t_4$ when (FIG. 38*a*) capacitor plates of the second capacitor 2 are connected by a third short circuit (the switching device 36 is on during a period of time $t_1-t_0$ and $t_5-t_4$ and the switching device 36 is off during a period of time $t_4-t_1$ and $t_8-t_5$). Therefore, these realizations can be used for controlling the maximum voltage of the load L and for changing motor speed with the minimum loss of energy (energy losses of known methods are big). In case of three phases, the realization shown in FIG. 36 can be repeated for each phase voltage. The branch with the first 1, second 2 and third 34 capacitors can be connected in parallel with voltage source 35 (FIG. 37) and the load L.

The step of combining the capacitor plates of said third group of capacitors with the capacitor plates, which have the same potential, of said second group of capacitors is demonstrated in FIG. 41. It is obvious that the steps illustrated in FIG. 17, FIG. 18, FIG. 19, FIG. 20, FIG. 21, FIG. 22, FIG. 23, FIG. 24, FIG. 25, FIG. 26 and FIG. 27 can be repeated on the combined 21 and non-combined 38 capacitor plates of the third capacitor 34 (FIG. 41). These steps ensure the lowest cost price of manufacturing the first 1, second 2 and third 34 capacitors.

The realization, shown in FIG. 42, uses as a cell a photoconductive cell 3. During a period of time $\Delta t_1=t_1-t_0$ (FIG. 15), the capacitor plates of the first capacitor 1 are connected through the photoconductive cell 3 because the light source 48, which is optically connected with the photoconductive cell 3, is on. In a moment $t_1$, $U_{44}=U_{th-46}$, where $U_{44}$ is a voltage of the capacitor 44, $U_{th-46}$ is the threshold voltage of the threshold switch 46. At this moment $t_1$, the trigger 47 breaks electric current of the light source 48. In a moment $t_F$ ($t_F-t_0<5R_{11}\times C_2$), the process of charging the capacitors 1 and 2 is finished. During a period of time $t_F-t_1$, the photoconductive cell 3 is in a state with higher impedance. During a period of time $t_F-t_0$, the photoconductive cell 45 is in a state with higher impedance because the light source 51, which is optically connected with the photoconductive cell 45, is off. In a moment $t_4$ (FIG. 15), the transistor switch 49 breaks electric current of the resistance 42 and electric current of the light source 51 is on by the trigger 50. The photoconductive cell 45 is in a state with low impedance and the capacitor 44 is discharged. Therefore, the light source 48 is on. One can change the duration of a period of time $\Delta t=t_F-t_1$, when the photoconductive cell 3 is in a state with a higher impedance, by changing the value of the resistance 43.

What is claimed is:

1. The method of obtaining the adjustable capacitor comprising the steps of:
    choosing the capacity of a first capacitor less than the capacity of a second capacitor;
    connecting at least said first and said second capacitors in series;
    connecting capacitor plates of said first capacitor through at least one cell, which changes its resistance or reactance, or at least one switching device or at least one adjustable resistance device or at least one adjustable reactance device;
    then converting at least one of said cells or switching devices or adjustable resistance devices or adjustable reactance devices into a non-conducting state or into a state with higher impedance within charging of said second capacitor;
    and then connecting electrically the capacitor plates of said first capacitor.

2. The method of obtaining the adjustable capacitor as claimed in claim 1 in which said steps of:
    connecting the capacitor plates of said first capacitor through at least one cell, which changes its resistance or reactance, or at least one switching device or at least one adjustable resistance device or at least one adjustable reactance device is realized right from the beginning of charging said second capacitor or before charging said second capacitor;
    connecting electrically the capacitor plates of said first capacitor is realized within discharging of said second capacitor.

3. The method of obtaining the adjustable capacitor as claimed in claim 2 in which said step of connecting electrically the capacitor plates of said first capacitor is realized as a short circuit.

4. The method of obtaining the adjustable capacitor as claimed in claim 3 in which said step of connecting electrically the capacitor plates of said first capacitor is realized at the end of discharging of said first capacitor or in time when discharging of said first capacitor is finished.

5. The method of obtaining the adjustable capacitor as claimed in claim 2, further comprising the steps of:
    detecting the voltage of said first capacitor within its discharging;
    receiving signals of detecting;
    and using said signals in said step of connecting electrically the capacitor plates of said first capacitor.

6. The method of obtaining the adjustable capacitor as claimed in claim 1 in which said step of connecting electrically the capacitor plates of said first capacitor is realized through at least one diode which is installed against current of charging of said first capacitor.

7. The method of obtaining the adjustable capacitor as claimed in claim 1, or 6, further comprising the step of changing the capacity of the adjustable capacitor by changing the duration of a period of time when at least one of said cells or switching devices or adjustable resistance devices or adjustable reactance devices is in a non-conducting state or in a state with higher impedance.

8. The method of obtaining the adjustable capacitor as claimed in claim 1, or 6, further comprising the steps of:
    connecting a voltage source to the capacitor plates, which do not have the same potential, of said first and second capacitors through at least one supplementary cell, which changes its resistance or reactance or through at least one supplementary adjustable resistance device or at least one supplementary adjustable reactance device;
    and changing the capacity of the adjustable capacitor by changing a value of resistance or reactance of said supplementary adjustable cell or a value of said supplementary adjustable resistance or reactance device.

9. The method of obtaining the adjustable capacitor as claimed in claim 1, or 6, further comprising the steps of:
    connecting the capacitor plates, which do not have the same potential, of said first and second capacitors through a voltage source;
    connecting a load to the capacitor plates, which do not have the same potential, of said first and second capacitors through a threshold switch;
    choosing the maximum voltage of said voltage source more than the started voltage of said threshold switch;
    and changing the capacity of the adjustable capacitor by changing a value of the voltage of said voltage source.

10. The method of obtaining the adjustable capacitor as claimed in claim 1, further comprising the step of combining a capacitor plate of said first capacitor with a capacitor plate of said second capacitor which have the same potential.

11. The method of obtaining the adjustable capacitor as claimed in claim 10, further comprising the step of making the area of the non-combined capacitor plate of said first capacitor smaller than the area of said combined capacitor plate.

12. The method of obtaining the adjustable capacitor as claimed in claim 11, further comprising the step of making the area of said combined capacitor plate bigger than the area of each of said non-combined capacitor plates.

13. The method of obtaining the adjustable capacitor as claimed in claim 12 in which said all capacitor plates are realized as spirals.

14. The method of obtaining the adjustable capacitor as claimed in claim 12, further comprising the steps of:

installing said all capacitor plates in a hermetic volume;

filling said hermetic volume by at least a gas with a higher pressure than the atmospheric pressure or creating a vacuum in said hermetic volume with a pressure between $10^{-8}$ and 0,6 Pa.

15. The method of obtaining the adjustable capacitor as claimed in claim 14, further comprising the step of cooling the capacitor plates by a cooling system or coolers installed outside of said hermetic volume.

16. The method of obtaining the adjustable capacitor as claimed in claim 12, or 15 further comprising the step of making the area of said combined capacitor plate of said third capacitor bigger than the area of each of said non-combined capacitor plates.

17. The method of obtaining the adjustable capacitor as claimed in claim 10, further comprising the step of making the area of said combined capacitor plate smaller than the area of each of said non-combined capacitor plates.

18. The method of obtaining the adjustable capacitor as claimed in claim 10, 11, 12, 13, or 17, further comprising the step of isolating the capacitor plates of said first capacitor by at least one insulator which has lesser permittivity than the permittivity of a insulator or insulators of the capacitor plates of said second capacitor.

19. The method of obtaining the adjustable capacitor as claimed in claim 1, or 6, further comprising the steps of:

choosing at least two other capacitors accordingly equal to said first and second capacitors;

connecting said two other capacitors in series;

repeating on said other capacitors all steps which are realized with said first and second capacitors;

connecting said first, second and said other capacitors in series during discharging of said all capacitors.

20. The method of obtaining the adjustable capacitor as claimed in claim 1, further comprising the steps of:

connecting a third capacitor with said first capacitor or with said second capacitor in series;

removing charging of said third capacitor by a short circuit or by a circuit with a low impedance during a period of time when the voltage direction is positive;

then removing charging of said first capacitor by a second short circuit or by a circuit with a low impedance during a period of time when the voltage direction is negative;

then connecting capacitor plates of said third capacitor through at least one additional cell, which changes its resistance or reactance, or at least one additional switching device or at least one additional adjustable resistance device or at least one additional adjustable reactance device;

then converting at least one of said additional cells or additional switching devices or additional adjustable resistance devices or additional adjustable reactance devices into a non-conducting state or into a state with higher impedance within charging of said second capacitor;

and then connecting electrically the capacitor plates of said third capacitor.

21. The method of obtaining the adjustable capacitor as claimed in claim 20, further comprising the step of choosing the capacity of said third capacitor equal to the capacity of said first capacitor.

22. The method of obtaining the adjustable capacitor as claimed in claim 21 in which said step of connecting electrically the capacitor plates of said third capacitor is realized through at least one additional diode which is installed against current of charging of said third capacitor.

23. The method of obtaining the adjustable capacitor as claimed in claim 22, in which said steps of charging and discharging said capacitors are realized through at least one load.

24. The method of obtaining the adjustable capacitor as claimed in claim 22 in which said steps of charging and discharging said capacitors are realized through at least one load and rectifier.

25. The method of obtaining the adjustable capacitor as claimed in claim 23, or 24, further comprising the steps of:

connecting capacitor plates of said second capacitor by a third short circuit or by a circuit with a low impedance and then breaking said third short circuit or said circuit with a low impedance.

26. The method of obtaining the adjustable capacitor as claimed in claim 20, further comprising the step of combining a capacitor plate of said third capacitor with a capacitor plate of said second capacitor which have the same potential.

27. The method of obtaining the adjustable capacitor as claimed in claim 26, further comprising the step of making the area of the non-combined capacitor plate of said third capacitor smaller than the area of said combined capacitor plate.

28. The method of obtaining the adjustable capacitor comprising the steps of:

choosing the capacity of a first group of capacitors, which has first and second output terminals, less than the capacity of a second group of capacitors which has first and second output terminals;

connecting at least said first and second groups of capacitors in series;

connecting said first and second output terminals of said first group of capacitors through at least one cell, which changes its resistance or reactance, or at least one switching device or at least one adjustable resistance device or at least one adjustable reactance device;

then converting at least one of said cells or switching devices or adjustable resistance devices or adjustable reactance devices into a non-conducting state or into a state with higher impedance within charging of said second group of capacitors;

and then connecting electrically said first and second output terminals of said first group of capacitors.

29. The method of obtaining the adjustable capacitor as claimed in claim 28 in which said steps of:

connecting said first and second output terminals of said first group of capacitors through at least one cell, which changes its resistance or reactance, or at least one switching device or at least one adjustable resistance device or at least one adjustable reactance device is realized right from the beginning of charging said second group of capacitors or before charging said second group of capacitors;

connecting electrically said first and second output terminals of said first group of capacitors is realized within discharging of said second group of capacitors.

30. The method of obtaining the adjustable capacitor as claimed in claim 29 in which said step of connecting electrically said first and second output terminals of said first group of capacitors is realized as a short circuit.

31. The method of obtaining the adjustable capacitor as claimed in claim 30 in which said step of connecting electrically said first and second output terminals of said first group of capacitors is realized at the end of discharging of said first group of capacitors or in time when discharging of said first group of capacitors is finished.

32. The method of obtaining the adjustable capacitor as claimed in claim 29, further comprising the steps of:
detecting the voltage of said first group of capacitors within its discharging;
receiving signals of detecting;
and using said signals in said step of connecting electrically said output terminals of said first group of capacitors.

33. The method of obtaining the adjustable capacitor as claimed in claim 28 in which said step of connecting electrically said first and second output terminals of said first group of capacitors is realized through at least one diode which is installed against current of charging of said first group of capacitors.

34. The method of obtaining the adjustable capacitor as claimed in claim 28, or 33, further comprising the step of changing the capacity of the adjustable capacitor by changing the duration of a period of time when at least one of said cells or switching devices or adjustable resistance devices or adjustable reactance devices is in a non-conducting state or in a state with higher impedance.

35. The method of obtaining the adjustable capacitor as claimed in claim 28, or 33, further comprising the steps of:
connecting a voltage source to said output terminals, which do not have the same potential, of said first and second groups of capacitors through at least one supplementary cell, which changes its resistance or reactance or through at least one supplementary adjustable resistance device or at least one supplementary adjustable reactance device;
and changing the capacity of the adjustable capacitor by changing a value of resistance or reactance of said supplementary adjustable cell or a value of said supplementary adjustable resistance or reactance device.

36. The method of obtaining the adjustable capacitor as claimed in claim 28, or 33, further comprising the steps of:
connecting said output terminals, which do not have the same potential, of said first and second groups of capacitors through a voltage source;
connecting a load to said output terminals, which do not have the same potential, of said first and second groups of capacitors through a threshold switch;
choosing the maximum voltage of said voltage source more than the started voltage of said threshold switch;
and changing the capacity of the adjustable capacitor by changing a value of the voltage of said voltage source.

37. The method of obtaining the adjustable capacitor as claimed in claim 28, further comprising the step of combining the capacitor plates of said first group of capacitors with the capacitor plates, which have the same potential, of said second group of capacitors.

38. The method of obtaining the adjustable capacitor as claimed in claim 37 further comprising the step of making the area of the non-combined capacitor plates of said first group of capacitors smaller than the area of said combined capacitor plates.

39. The method of obtaining the adjustable capacitor as claimed in claim 38 further comprising the step of making the area of said combined capacitor plates bigger than the area of each of said non-combined capacitor plates.

40. The method of obtaining the adjustable capacitor as claimed in claim 39 in which said all capacitor plates are realized as spirals.

41. The method of obtaining the adjustable capacitor as claimed in claim 37 in which the area of said combined capacitor plates is realized smaller than the area of each of said non-combined capacitor plates.

42. The method of obtaining the adjustable capacitor as claimed in claim 37, 38, 39, 40, or 41, further comprising the step of isolating the capacitor plates of said first group of capacitors by at least one insulator which has lesser permittivity than the permittivity of a insulator or insulators of the capacitor plates of said second group of capacitors.

43. The method of obtaining the adjustable capacitor as claimed in claim 39, further comprising the steps of:
installing said all capacitor plates in a hermetic volume;
filling said hermetic volume by at least a gas with a higher pressure than the atmospheric pressure or creating a vacuum in said hermetic volume with a pressure between $10^{-8}$ and 0,6 Pa.

44. The method of obtaining the adjustable capacitor as claimed in claim 43, further comprising the step of cooling the capacitor plates by a cooling system or coolers installed outside of said hermetic volume.

45. The method of obtaining the adjustable capacitor as claimed in claim 39, or 44 further comprising the step of making the area of said combined capacitor plates of said third group of capacitors bigger than the area of each of said non-combined capacitor plates.

46. The method of obtaining the adjustable capacitor as claimed in claim 28, or 33, further comprising the steps of:
choosing at least two other groups of capacitors accordingly equal to said first and second group of capacitors;
connecting said two other groups of capacitors in series;
repeating on said other groups of capacitors all steps which are realized with said first and second groups of capacitors;
connecting said first, second groups of capacitors and said other groups of capacitors in series during discharging of said all capacitors.

47. The method of obtaining the adjustable capacitor as claimed in claim 31, further comprising the steps of:
connecting a third group of capacitors, which has first and second output terminals, with said first group of capacitors or with said second group of capacitors in series;
removing charging of said third group of capacitors by a short circuit or by a circuit with a low impedance during a period of time when the voltage direction is positive;
then removing charging of said first group of capacitors by a second short circuit or by a circuit with a low impedance during a period of time when the voltage direction is negative;
then connecting said output terminals of said third group of capacitors through at least one additional cell, which changes its resistance or reactance, or at least one additional switching device or at least one additional adjustable resistance device or at least one additional adjustable reactance device;

then converting at least one of said additional cells or additional switching devices or additional adjustable resistance devices or additional adjustable reactance devices into a non-conducting state or into a state with higher impedance within charging of said second group of capacitors;

and then connecting electrically said output terminals of said third group of capacitors.

48. The method of obtaining the adjustable capacitor as claimed in claim 47, further comprising the step of choosing the capacity of said third group of capacitors equal to the capacity of said first group of capacitors.

49. The method of obtaining the adjustable capacitor as claimed in claim 48 in which said step of connecting electrically said output terminals of said third group of capacitors is realized through at least one additional diode which is installed against current of charging of said third group of capacitors.

50. The method of obtaining the adjustable capacitor as claimed in claim 49 in which said steps of charging and discharging said groups of capacitors are realized through at least one load.

51. The method of obtaining the adjustable capacitor as claimed in claim 49, or 50, flirter comprising the steps of:

connecting said output terminals of said second group of capacitors by a third short circuit or by a circuit with a low impedance and then breaking said third short circuit or said circuit with a low impedance.

52. The method of obtaining the adjustable capacitor as claimed in claim 49 in which said steps of charging and discharging said groups of capacitors are realized through at least one load and rectifier.

53. The method of obtaining the adjustable capacitor as claimed in claim 47, further comprising the step of combining the capacitor plates of said third group of capacitors with the capacitor plates, which have the same potential, of said second group of capacitors.

54. The method of obtaining the adjustable capacitor as claimed in claim 53, further comprising the step of making the area of the non-combined capacitor plates of said third group of capacitors smaller than the area of said combined capacitor plates.

* * * * *